(12) United States Patent
Kondo

(10) Patent No.: US 8,042,104 B2
(45) Date of Patent: Oct. 18, 2011

(54) METHOD AND SYSTEM FOR SENDING A REWRITE CONTROL PROGRAM TO A CONTROL UNIT

(75) Inventor: Haruhiko Kondo, Kasugai (JP)

(73) Assignee: Denso Corporation, Kariya (JP)

( * ) Notice: Subject to any disclaimer, the term of this patent is extended or adjusted under 35 U.S.C. 154(b) by 1735 days.

(21) Appl. No.: 11/247,590

(22) Filed: Oct. 12, 2005

(65) Prior Publication Data
US 2006/0090159 A1 Apr. 27, 2006

(30) Foreign Application Priority Data
Oct. 12, 2004 (JP) .................................. 2004-297595

(51) Int. Cl.
*G06F 9/44* (2006.01)
*G06F 15/177* (2006.01)

(52) U.S. Cl. ........................................... 717/168; 713/2
(58) Field of Classification Search .......... 717/169–171, 717/11; 713/1, 100; 714/819; 711/100, 711/103; 725/50; 365/104, 185.04; 369/53.24; 710/22
See application file for complete search history.

(56) References Cited

U.S. PATENT DOCUMENTS

| | | | | |
|---|---|---|---|---|
| 5,325,377 A * | 6/1994 | Tuttle | ............................... | 714/819 |
| 5,757,690 A * | 5/1998 | McMahon | ..................... | 365/104 |
| 6,275,911 B1 | 8/2001 | Terada et al. | | |
| 6,480,928 B2 | 11/2002 | Yashiki et al. | | |
| 6,490,663 B1 | 12/2002 | Komori | | |
| 6,640,334 B1 * | 10/2003 | Rasmussen | .................... | 717/171 |
| 7,020,060 B2 * | 3/2006 | Tsukihashi | ................. | 369/53.24 |
| 7,334,117 B2 * | 2/2008 | Wilson et al. | ...................... | 713/1 |
| 7,657,886 B1 * | 2/2010 | Chen et al. | ...................... | 717/170 |
| 2001/0044934 A1 * | 11/2001 | Hirai et al. | ........................ | 717/11 |
| 2004/0163112 A1 * | 8/2004 | Matula et al. | .................... | 725/50 |
| 2005/0120146 A1 * | 6/2005 | Chen et al. | ....................... | 710/22 |

FOREIGN PATENT DOCUMENTS

| | | |
|---|---|---|
| JP | 10-097419 | 4/1998 |
| JP | 10-149282 | 6/1998 |
| JP | 11-143702 | 5/1999 |
| JP | 2000-029710 | 1/2000 |
| JP | 2001-166942 | 6/2001 |
| JP | 2001-263156 | 9/2001 |
| JP | 2002-278766 | 9/2002 |
| JP | 2003-208326 | 7/2003 |

OTHER PUBLICATIONS

Euroloader, "Technical Specification of a European Loader, ECCA EuroLoader Specification", Dec. 2001 (herein Euroloader.*
Japanese Office Action dated Nov. 17, 2009 issued in corresponding Japanese Application No. 2004-297595 with an at least partial English language translation thereof.

* cited by examiner

*Primary Examiner* — Tuan Anh Vu
(74) *Attorney, Agent, or Firm* — Nixon & Vanderhye P.C.

(57) ABSTRACT

A control unit has a first storing unit storing data of a rewrite control program received by the control unit in a rewritable storage medium at a destination address thereof received thereby. The control unit has a second storing unit storing the destination address in the rewritable storage medium at a destination storing address thereof received by the control unit. The control unit has an execution unit referring to the destination address stored at the destination storing address in the rewritable storage medium and executing the rewrite control program stored in the rewritable storage medium based on the referred destination address.

3 Claims, 8 Drawing Sheets

METHOD AND SYSTEM FOR SENDING A REWRITE CONTROL PROGRAM TO A CONTROL UNIT

CROSS REFERENCE TO RELATED APPLICATION

This application is based on Japanese Patent Application 2004-297595 filed on Oct. 12, 2004. The descriptions of the Patent Application are therefore all incorporated herein by reference.

BACKGROUND OF THE INVENTION

1. Field of the Invention

The present invention relates to methods and systems for sending a rewrite control program to a control unit, such as a vehicle control unit. The control unit has a first function of receiving the sent rewrite control program to store it in a rewritable memory of the control unit, and a second function of causing the execution point of the control unit to jump to the leading address of the rewrite control program.

In addition, the present invention is associated with control units having the first and second functions set forth above, programs for sending a rewrite control program to a control unit, and boot programs capable of receiving a rewrite control program and booting it.

2. Description of the Related Art

In vehicle control, vehicle control units have used techniques for downloading a rewrite control program from the outside thereof and for executing the downloaded rewrite control program that allows the control units to rewrite application programs installed therein into new application programs. Such application programs include an engine-ignition control program, an automatic-transmission control program, and other similar vehicle-control programs.

An example of such rewrite control program downloading and executing methods, which has been used in common, includes the steps of downloading a rewrite control program to a predetermined area of a RAM (Random Access Memory) of a vehicle control unit; and causing the execution location to jump to the leading address of the predetermined area after the completion of the download in the RAM. A program that allows a vehicle control unit to carry out this method is referred to as a rewrite control program receiving and booting program hereinafter.

An actual example of the method in accordance with the rewrite control program receiving and booting program set forth above will be described hereinafter with reference to FIGS. 8 and 9. FIG. 8 is a view schematically illustrating the structure of a memory unit 50 of a vehicle control unit installed in a vehicle and illustrating data flow between an external tool 60, such as a personal computer, and the memory unit 50. FIG. 9 is a flowchart schematically illustrating the structure of a boot program 53 corresponding to the rewrite control program receiving and booting program.

In the actual example illustrated in FIGS. 8 and 9, the vehicle control unit runs the boot program 53 stored in a flash ROM (Read Only Memory) 51 of the memory unit 50 immediately after it is booted up. The boot program 53 causes the vehicle control unit to receive a rewrite control program 55 sent from the external tool 60 communicable with the vehicle control unit. The boot program 53 causes the vehicle control unit to store the received rewrite control program 55 in a predetermined area of a RAM 52 of the memory unit 50 from an address of the RAM 52 (see the arrow 61 in FIG. 8).

Specifically, as illustrated in FIG. 9, the boot program 53 allows the vehicle control unit to execute the following operations.

In step S531 of FIG. 9, the vehicle control unit executes initialization, and determines whether to detect a rewrite request sent from the external tool 60 in step S532.

When it is determined that no rewrite requests are detected after a predetermined period of time has elapsed, that is, when the determination in step S532 is NO, the execution point of the vehicle control unit jumps to an application program stored in the RAM 52 in step S532a.

When it is determined that the rewrite request sent from the external tool 60 is detected, that is, the determination in step S532 is YES, the vehicle control unit waits for data being sent from the external tool 60 in step S533.

When the vehicle control unit receives an address command containing address data indicative of the address in the RAM 52 and data indicative of the size of the rewrite control program 55, which is sent from the external tool 60, the determination in step S534 is YES. Then, the vehicle control unit reads out the address data contained in the address command to store it in the RAM 52 as a rewrite address in step S535.

After that, every time the vehicle control unit receives a data command containing a module of the rewrite control program 55 in step S536, it reads out the module of the rewrite control program 55 contained in each data command to sequentially write the readout modules of the rewrite control program 55 into the RAM 52 from the rewrite address thereof in the order of reception in step S537.

When all of the modules constituting the rewrite control program 55 are stored in the RAM 52, the vehicle control unit causes its execution point to jump to the rewrite address of the RAM's predetermined area in which the rewrite control program is stored (see the arrow 62 in FIG. 8).

Specifically, as illustrated in step S538 of FIG. 9, the vehicle control unit determines whether the whole volume of the modules of the rewrite control program 55, which have ever been received to be stored in the RAM 52, reaches the volume equivalent to the size of the rewrite control program 55, which is received in step S534.

When it is determined that the whole volume of the modules of the rewrite control program 55, which have ever been received to be stored in the RAM 52, reaches the volume equivalent to the size of the rewrite control program 55, the vehicle control unit completes the download of the rewrite control program 55 in step S539. Subsequently, in step S539, the vehicle control unit causes its execution point to jump to the destination address corresponding to the rewrite address of the rewrite control program 55 stored in the RAM 52, exiting the boot program 53, and thereafter, starts to execute the rewrite control program 55.

The execution of the rewrite control program 55 allows the vehicle control unit to receive an application program 54 from the external tool 60, and to store the received application program 54 in a predetermined area of the flash ROM 51.

Application programs to be executed by various types of vehicle control units installed in vehicles of various models commonly have different program sizes depending on the vehicle destinations and/or the vehicle models. In addition, structures of memory units of the vehicle control units are commonly different from each other depending on the vehicle destinations and/or the vehicle models. These points may cause areas of RAMs in which rewrite control programs are stored to be different from each other.

From this viewpoint, the conventional rewrite control program receiving and booting program, which is referred to simply as conventional booting program, is described such that the execution point jumps to the predetermined address of the rewrite control program after the completion of the download. Accordingly, when installing the conventional booting programs into various types of vehicle control units, it may be necessary to rewrite the conventional booting programs so as to meet variable addresses to which the execution points of the various types of vehicle control units jump after the completion of the download, respectively.

The program rewrite operations may however cause the efficiency of installation of the conventional booting programs into the corresponding vehicle control units to deteriorate.

SUMMARY OF THE INVENTION

The present invention has been made on the background set forth above. Specifically, at least one preferable embodiment of the present invention provides a method and system for sending a rewrite control program to a control unit without causing the efficiency of installation of a boot program in the control unit; this boot program is required to receive the rewrite control program and to boot it.

According to one aspect of the present invention, there is provided a method of sending, to a control unit with a rewritable storage medium, a rewrite control program so that the control unit executes the rewrite control program based on a predetermined destination address in the rewritable storage medium. The method includes sending, to the control unit, first designating data designating the destination address in the rewritable storage medium, and sending, to the control unit, data of the rewrite control program, the data of the rewrite control program being stored in the rewritable storage medium at the destination address thereof. The method also includes sending, to the control unit, second designating data designating a destination storing address in the rewritable storage medium, and sending, to the control unit, destination address data indicative of the destination address. The destination address data is stored in the rewritable storage medium at the destination storing address thereof.

According to another aspect of the present invention, there is provided a method of sending, to a control unit having a rewritable storage medium with a destination storing address at which an initial value has been stored, a rewrite control program. This results in that the control unit executes the rewrite control program based on a predetermined destination address in the rewritable storage medium after data stored in the destination storing address is different from the initial value. The method includes sending, to the control unit, first designating data designating the destination address in the rewritable storage medium, and sending, to the control unit, modules of the rewrite control program, the modules of the rewrite control program being stored in the rewritable storage medium from the destination address thereof. The method also includes sending, to the control unit, second designating data designating the destination storing address in the rewritable storage medium, and sending, to the control unit, destination address data indicative of the destination address. The destination address data is stored in the rewritable storage medium at the destination storing address thereof so that the initial value is rewritten into the destination address.

According to a further aspect of the present invention, there is provided a system for sending, to a control unit with a rewritable storage medium, a rewrite control program so that the control unit executes the rewrite control program based on a predetermined destination address in the rewritable storage medium. The system includes a first sending unit configured to send, to the control unit, first designating data designating the destination address in the rewritable storage medium, and a second sending unit configured to send, to the control unit, data of the rewrite control program. The data of the rewrite control program is stored in the rewritable storage medium at the destination address thereof. The system further includes a third sending unit configured to send, to the control unit, second designating data designating a destination storing address in the rewritable storage medium, and a fourth sending unit configured to send, to the control unit, destination address data indicative of the destination address. The destination address data is stored in the rewritable storage medium at the destination storing address thereof.

According to a still further aspect of the present invention, there is provided a system for sending, to a control unit having a rewritable storage medium with a destination storing address at which an initial value has been stored, a rewrite control program. This results in that the control unit executes the rewrite control program based on a predetermined destination address in the rewritable storage medium after data stored in the destination storing address is different from the initial value. The system includes a first sending unit configured to send, to the control unit, first designating data designating the destination address in the rewritable storage medium, and a second sending unit configured to send, to the control unit, modules of the rewrite control program. The modules of the rewrite control program are stored in the rewritable storage medium from the destination address thereof. The system includes a third sending unit configured to send, to the control unit, second designating data designating the destination storing address in the rewritable storage medium, and a fourth sending unit configured to send, to the control unit, destination address data indicative of the destination address. The destination address is stored in the rewritable storage medium at the destination storing address thereof so that the initial value is rewritten into the destination address.

According to a still further aspect of the present invention, there is provided a program product having a rewritable control program sending program and a signal bearing media bearing the rewritable control program sending program. The rewritable control program sending program is designed to send, to a control unit with a rewritable storage medium, a rewrite control program so that the control unit executes the rewrite control program based on a predetermined destination address in the rewritable storage medium. The rewritable control program sending program includes first means for instructing a computer to send, to the control unit, first designating data designating the destination address in the rewritable storage medium, and second means for instructing a computer to send, to the control unit, data of the rewrite control program. The data of the rewrite control program is stored in the rewritable storage medium at the destination address thereof. The rewritable control program sending program includes third means for instructing a computer to send, to the control unit, second designating data designating a destination storing address in the rewritable storage medium, and fourth means for instructing a computer to send, to the control unit, destination address data indicative of the destination address. The destination address data is stored in the rewritable storage medium at the destination storing address thereof.

According to a still further aspect of the present invention, there is provided a control unit for executing a rewrite control program to rewrite an application program stored therein. The control unit includes a rewritable storage medium, a first receiving unit configured to receive first designating data designating a destination address in the rewritable storage medium, and a second receiving unit configured to receive data of the rewrite control program. The control unit also includes a first storing unit configured to store the received data of the rewrite control program in the rewritable storage medium at the received destination address thereof, and a third receiving unit configured to receive second designating data designating a destination storing address in the rewritable storage medium. The control unit further includes a fourth receiving unit configured to receive destination address data indicative of the destination address and a second storing unit configured to store the destination address data in the rewritable storage medium at the received destination storing address thereof. The control unit includes an execution unit configured to refer to the destination address stored at the destination storing address in the rewritable storage medium and to execute the rewrite control program stored in the rewritable storage medium based on the referred destination address.

According to a still further aspect of the present invention, there is provided a program product having a boot program for booting a rewritable control program and a signal bearing media bearing the boot program. The boot program includes first means for instructing a computer to receive first designating data designating a destination address in the rewritable storage medium, and a second means for instructing a computer to receive data of the rewrite control program. The boot program also includes third means for instructing a computer to store the received data of the rewrite control program in the rewritable storage medium at the received destination address thereof, and fourth means for instructing a computer to receive second designating data designating a destination storing address in the rewritable storage medium. The boot program further includes fifth means for instructing a computer to receive destination address data indicative of the destination address, and sixth means for instructing a computer to store the destination address in the rewritable storage medium at the received destination storing address thereof. Still furthermore, the boot program includes seventh means for instructing a computer to refer to the destination address stored at the destination storing address in the rewritable storage medium and to execute the rewrite control program stored in the rewritable storage medium based on the referred destination address.

BRIEF DESCRIPTION OF THE DRAWINGS

Other objects and aspects of the invention will become apparent from the following description of an embodiment with reference to the accompanying drawings in which.

DETAILED DESCRIPTION OF EMBODIMENTS OF THE INVENTION

An embodiment of the present invention will be described hereinafter with reference to FIGS. 1 to 6.

Figure 1:
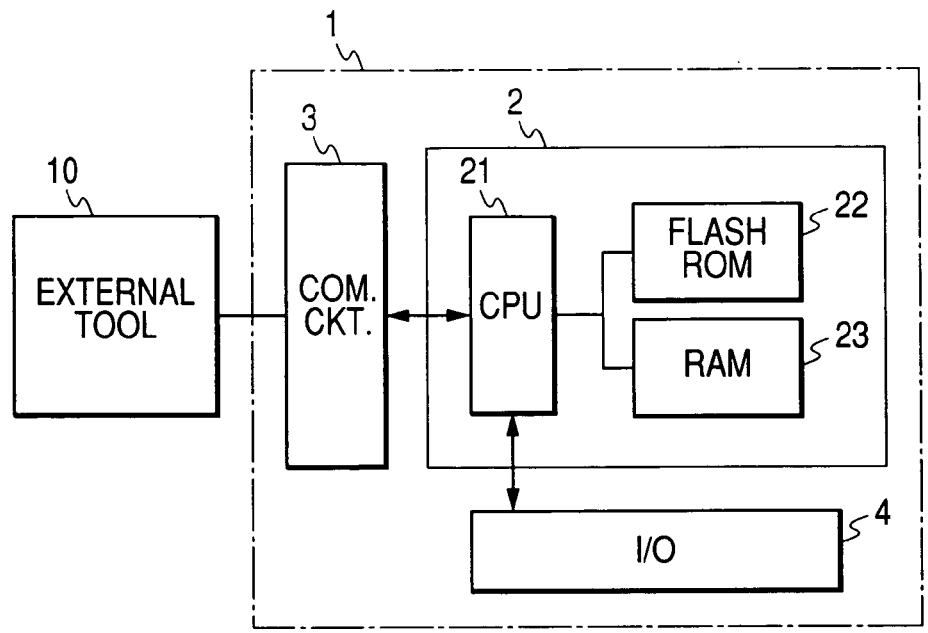
FIG. 1 is a block diagram schematically illustrating an example of the hardware structure of an engine electronic control unit as an example of vehicle control units according to an embodiment of the present invention.

FIG. 1 illustrates an example of the hardware structure of an engine electronic control unit (engine ECU) 1 as an example of vehicle control units according to the embodiment of the present invention.

As illustrated in FIG. 1, the engine ECU 1 is provided with a microcomputer 2, a communication circuit 3, and an input/output (I/O) circuit 4. The communication circuit 3 is communicably coupled to the microcomputer 2, and the I/O circuit 4 is communicably coupled to the microcomputer 2.

The microcomputer 2 includes a CPU 21, a flash ROM 22 as an example of rewritable nonvolatile storage media, and a RAM 23 as an example of rewritable volatile storage media. The CPU 21 is accessibly coupled to the flash ROM 22 and the RAM 23. The flash ROM 22 has already stored therein at least a boot program 200. The RAM 23 serves as a main working memory of the CPU 21. The CPU 21 is operative to run programs stored in the flash ROM 22 or RAM 23. The running programs allow the CPU 21 to transmit/receive data to/from the communication circuit 3 and I/O circuit 4 and to read/write data from/to the flash ROM 22 and the RAM 23.

The communication circuit 3 is communicably coupled to an external tool 10 via a communication cable or without wires. The communication circuit 3 is operative to receive data sent from the external tool 10. The communication circuit 3 is also operative to process the received data based on predetermined communication protocols so as to allow the CPU 21 to process the processed data; these communication protocols corresponds to the communication protocols of the external tool 10. For example, as the communication protocols, the USB (Universal Serial Bus) protocols, the IEEE (Institute of Electrical and Electronics Engineers) 1394 protocols, and the RS-232C protocols can be applied.

Furthermore, the communication circuit 3 is operative to receive data sent from the CPU 21 and to process the received data based on the communication protocols corresponding to those of the external tool 10, thereby sending the CPU-processed data to the external tool 10.

The I/O circuit 4 serves as an interface circuit through which the CPU 21 communicates with a plurality of sensors installed in the vehicle and configured to sense physical properties associated with the operating state of the engine. The sensors include a temperature sensor and a crank angle sensor. The I/O circuit 4 also serves as an interface circuit through which the CPU 21 communicates with a plurality of actuators. The actuators are installed in the vehicle and configured to control a plurality of mechanisms installed in the vehicle and associated with the engine; these mechanisms are required to operate the engine.

Specifically, the I/O circuit 4 is operative to receive sensor signals sent from the sensors and indicative of the measured quantities thereby and to output the received sensor signals to the CPU 21. In addition, the I/O circuit 4 is operative to receive control signals for actuators; these control signals are obtained by the CPU 21 based on the sensor signals and are sent from the CPU 21. The I/O circuit 4 is operative to output the control signals to the corresponding actuators, respectively; these control signals allow the corresponding actuators to work at the CPU's requests.

Figure 2:
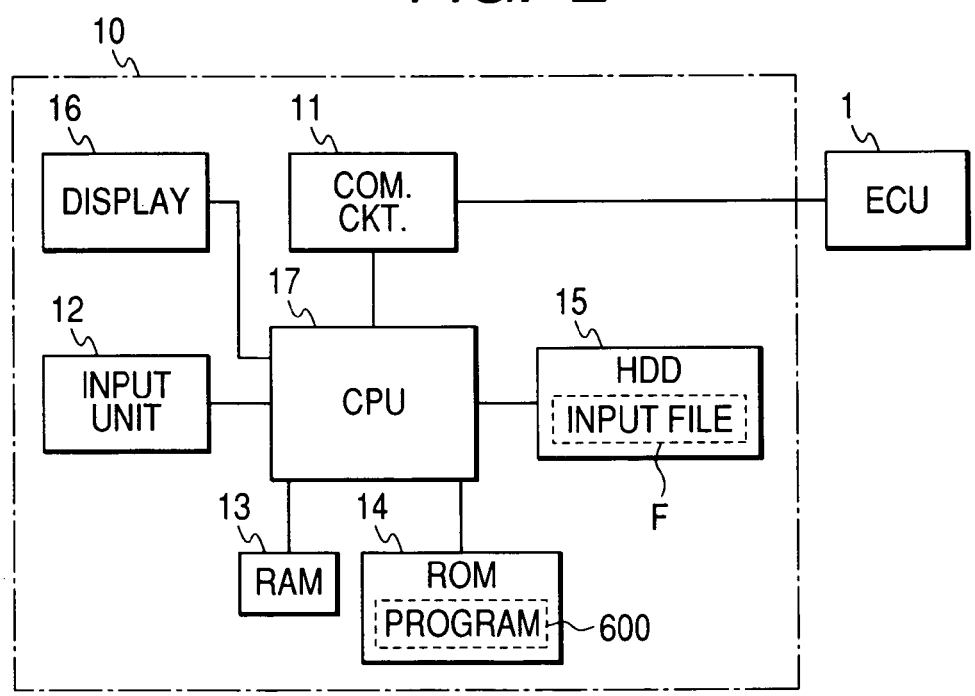
FIG. 2 is a block diagram schematically illustrating an example of the hardware structure of an external tool illustrated in FIG. 1.

FIG. 2 illustrates an example of the hardware structure of the external tool 10 according to the embodiment of the present invention. As the external tool 10, a general-purpose personal computer or a dedicated device for sending data to the engine ECU 1 can be used.

As illustrated in FIG. 2, the external tool 10 is provided with a communication circuit 11, an input unit 12, a RAM 13, a ROM 14, a hard disk drive (HDD) 15, a display 16, and a CPU 17. The CPU 17 is accessibly coupled to the RAM 13, the ROM 14, and the HDD 15.

The communication circuit 11 is communicably coupled to the communication circuit 3 of the engine ECU 1 via a communication cable or without wires. The communication circuit 11 is operative to receive data sent from the communication circuit 3 of the engine ECU 1. The communication circuit 11 is also operative to process the received data based on the communication protocols set forth above so as to allow the CPU 17 to process the processed data.

Furthermore, the communication circuit 11 is operative to receive data sent from the CPU 17 and to process the received data based on the communication protocols, thereby sending the CPU-processed data to the communication circuit 3 of the engine ECU 1.

The display 16 is communicably coupled to the CPU 17. The display 16 is operative to present data sent from the CPU 17 on its screen.

The input unit 12 has, for example, a keyboard and a pointing device, such as a mouse. The input unit 12 is operative to enter data, such as various commands, on, for example, the screen of the display 16 into the CPU 17 when a user operates the keyboard and/or the mouse.

The RAM 13 is used as an example of readable and rewritable volatile storage media, and the ROM 14 is used as an example of read-only nonvolatile storage media. The HDD 15 is applied as an example of readable and rewritable nonvolatile storage media. The ROM 14 and the HDD 15 have stored therein programs to be read out by the CPU 17 and carried out thereby. In the embodiment, the ROM 14 has stored therein a rewrite control program sending program 600.

The ROM 14 and the HDD 15 have also stored therein data to be read out by the CPU 17 and required when the CPU 17 carries out the programs. Specifically, the HDD 15 has stored therein an input file F whose structure (file format) will be described hereinafter. The RAM 13 serves as a storage area that temporarily holds the programs when the CPU 17 executes them and data that the programs need.

Specifically, the CPU 17 is operative to load the programs stored in the ROM 14 and the HDD 13 to the RAM 13 and to run them. The running programs allow the CPU 17 to transmit/receive data to/from the engine ECU 1 through the communication circuit 11 and to read/write data from/to the RAM 13 and the HDD 15.

Figure 3:
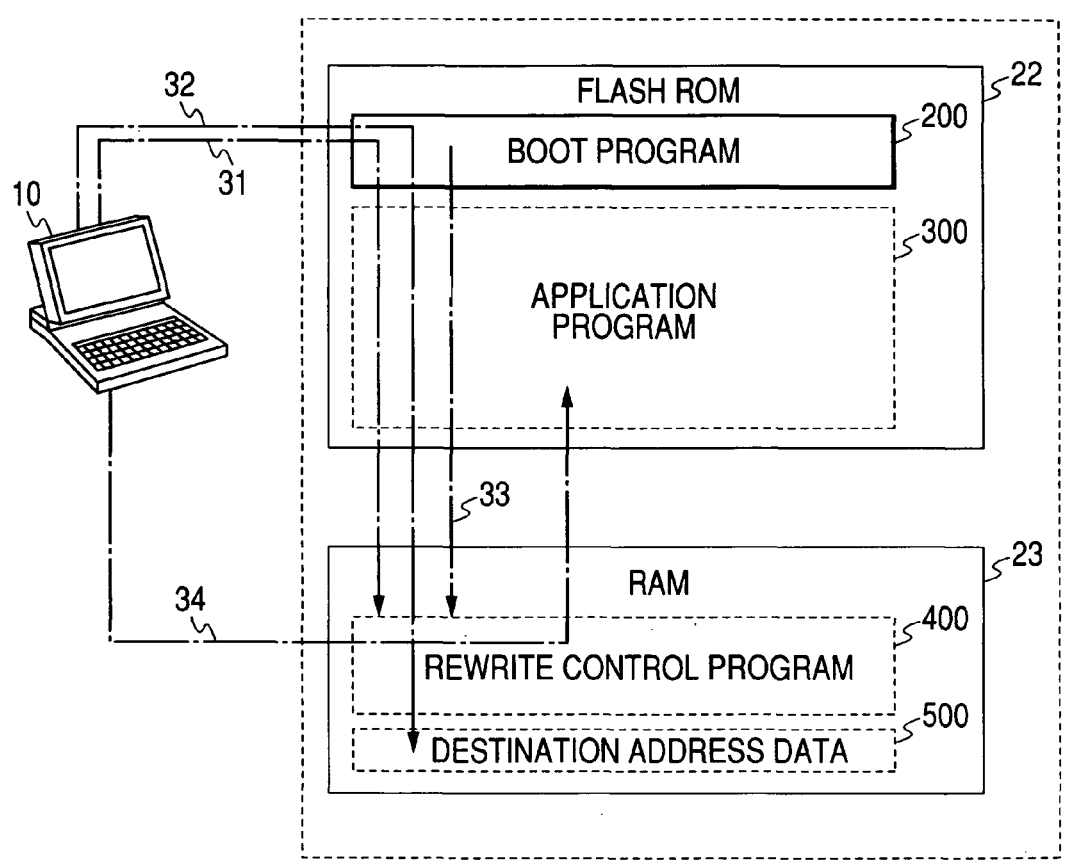
FIG. 3 is a block diagram schematically illustrating the structure of a storage area of each of a RAM and a Rash ROM, illustrating data flow between the external tool, the flash ROM, and the RAM, and illustrating the operations of a CPU of the engine ECU according to the embodiment.

Schematic operations of the engine ECU 1 and the external tool 10 according to the embodiment will be schematically described hereinafter with reference to FIG. 3. FIG. 3 is a view schematically illustrating the structure of the storage area of each of the RAM 23 and the flash ROM 22, illustrating data flow between the external tool 10, the flash ROM 22, and the RAM 23, and illustrating the operations of the CPU 21 of the engine ECU 1 according to the embodiment.

In the embodiment, the CPU 21 first runs the boot program 200 stored in the flash ROM 22 immediately after being booted up. On the other hand, the external tool 10 sends, to the engine ECU 1, modules of the rewrite control program 400 and a first address command containing a destination address, such as a leading address AD1, at which the first instruction in the rewrite control program 400 should be stored in the RAM 23.

The CPU 21 of the engine ECU 1 receives the modules of the rewrite control program 400 through the communication circuit 3 and stores them in the storage area of the RAM 23; this storage area is determined based on the destination address of the received first address command (see the arrow 31 in FIG. 3).

When all of the modules constituting the rewrite control program 400 are stored in the RAM 23, the external tool 10 sends, to the engine ECU 1, a second address command designating a predetermined destination storing address AD2. The external tool 10 sends, to the engine ECU 1, destination address data 500 indicative of the leading address (the destination address) AD1 of the rewrite control program 400 to be stored in the RAM 23.

When receiving the second address command and the destination address data 500, the CPU 21 stores the destination address data 500 at the destination storing address AD2 in the RAM 23 (see the arrow 32 in FIG. 3).

After the completion of reception of all of the modules of the rewrite control program 400 and of store of them in the RAM 23, the CPU 21 causes its execution point to jump to the leading address AD1 stored in the destination storing address AD2 (see the arrow 33 in FIG. 3). Note that the destination storing address AD2 is one of common addresses of various types of RAMs, and can be determined at the time of creation of the boot program 200.

Thereafter, the CPU 21 starts to execute the rewrite control program 400 from the instruction stored at the leading address AD1 of the RAM 23. The rewrite control program causes the CPU 21 to receive the application program 300 sent from the external tool 10, thereby storing the received application program 300 in a predetermined area of the flash ROM 22 (see the arrow 34 in FIG. 3).

Figure 4:
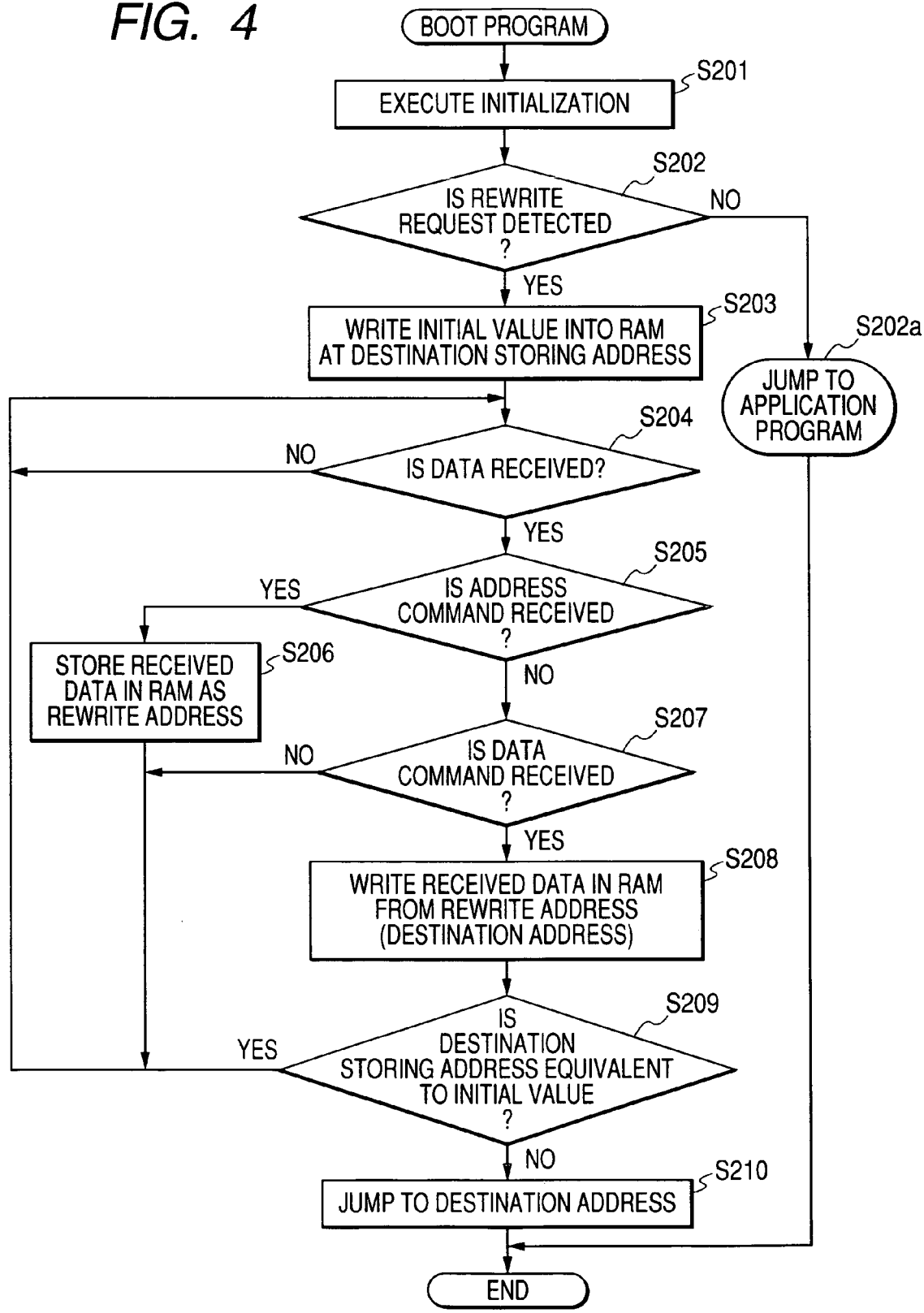
FIG. 4 is a flowchart schematically illustrating the structure of a boot program stored in the flash ROM illustrated in FIG. 1.
Figure 5:
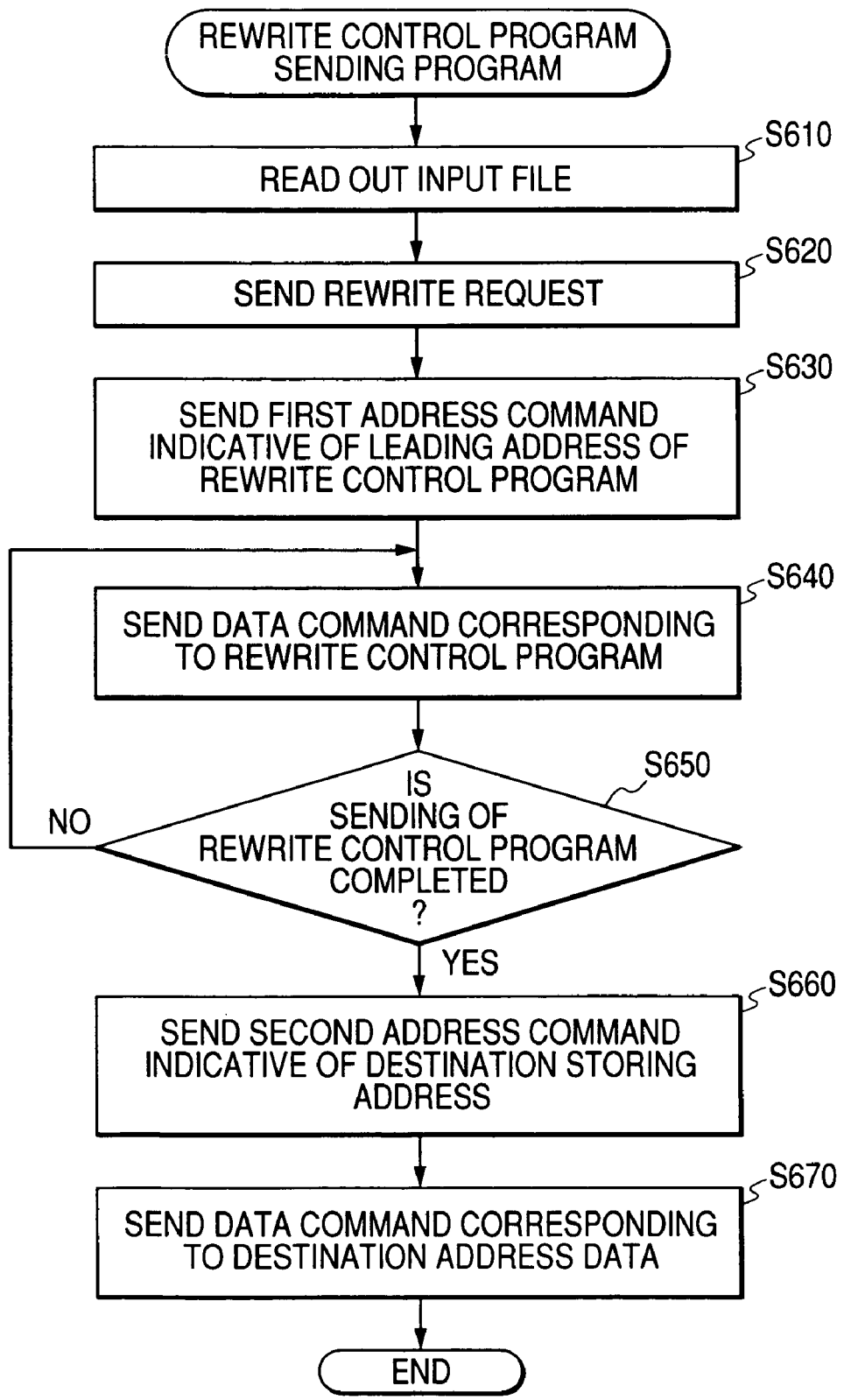
FIG. 5 is a flowchart schematically illustrating the structure of a rewrite control program sending program stored in the ROM illustrated in FIG. 2.

Specifically, as illustrated in FIGS. 4 and 5, the boot program 200 allows the CPU 21 to execute the following operations, and the rewrite control program sending program 600 allows the CPU 17 to execute the following operations.

First, an operator operates the input unit 12 to enter, into the CPU 17, a command requesting it to start to run the rewrite control program sending program 600. This allows the CPU 17 to start to run the rewrite control program sending program 600. In addition, the operator boots the engine ECU 1.

As illustrated in FIG. 5, the CPU 17 first reads out the input file F from the HDD 15 in step S610.

Figure 6:
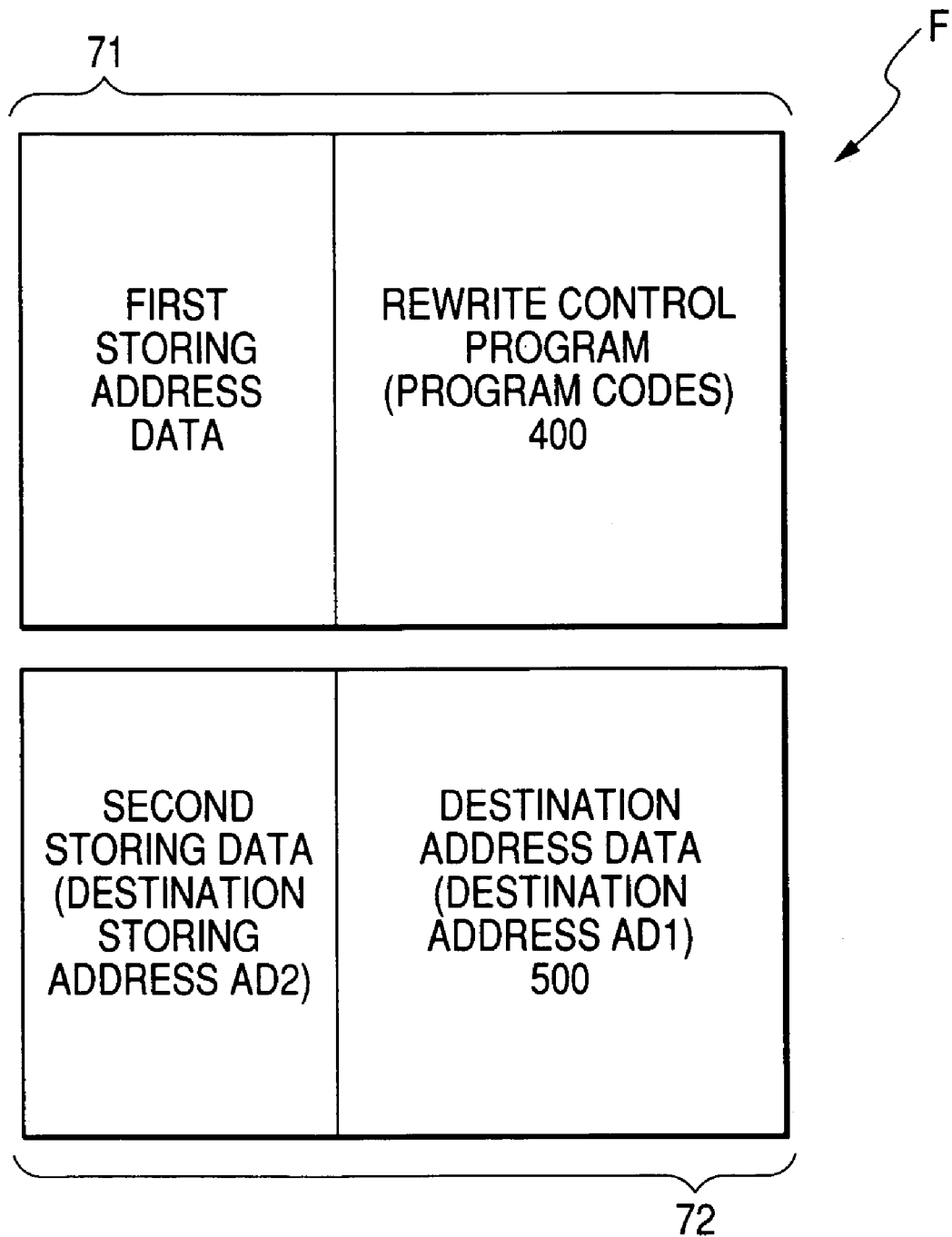
FIG. 6 is a view schematically illustrating an example of the structure of an input file stored in a HDD of the external tool illustrated in FIG. 2.

The schematic structure of the input file F is composed of, as illustrated in FIG. 6, a first data section 71 allocated for the rewrite control program 400 and a second data section 72 allocated for the destination address data 500. The first data section 71 has the rewrite control program (program codes) 400 as send data and first storing address data indicative of the location in the RAM 23 at which the send data (rewrite control program 400) should be stored. The second data section 72 has the destination address data 500 corresponding to the leading address (the destination address) AD1 of the rewrite control program 400 as send data and second storing address data indicative of the destination storing address AD2 at which the destination address data 500 should be stored in the RAM 23. Note that, as the input file F with the file structure set forth above, Motorola® S-format file can be used.

When reading out the input file F with the file structure set forth above, the CPU 17 outputs, to the communication circuit 11, a rewrite request against the engine ECU 1 and causes the communication circuit 11 to output the rewrite request to the communication circuit 3 of the engine ECU 1 in step S620.

After boot-up, the CPU 21 of the engine ECU 1 executes initialization for allowing the communication circuit 3 to be available in step S201, and determines whether to receive the rewrite request in step S202.

When it is determined that no rewrite requests are received after a predetermined period of time has elapsed, that is, when the determination in step S202 is NO, the CPU 21 causes its execution point to jump to an application program currently stored in the flash ROM 22 in step S202a.

When it is determined that the rewrite request sent from the external tool 10 is received, that is, the determination in step S202 is YES, the CPU 21 writes a predetermined initial value into the storage area of the RAM 23 at the destination storing address AD2 in step S203. Note that, for example, the predetermined initial value is a base 16 value of, for instance, FFFFFFFF (32 bits).

Subsequently, the CPU 21 waits for receiving data being sent from the external tool 10 in step S204.

On the other hand, after the sending of the rewrite request in step S620, the CPU 17 of the external tool 10 sends, through the communication circuit 11 to the communication circuit 3 of the engine ECU 1, the leading address AD1 of the rewrite control program 400 as the first address command with a predetermined address command format in step S630.

When the CPU 21 receives the first address command through the communication circuit 3 of the engine ECU 1, the determination in step S204 is YES. Then, the CPU 21 determines whether the received data is an address command in step S205.

Because the first address command is sent from the CPU 17 of the external tool 10 in step S630, the CPU 21 determines that the received data is an address command (the determination in step S205 is YES). After the affirmative determination in step S205, the CPU 21 stores the received data (the received leading address AD1) in a predetermined working area of the RAM 23 as a first writing variable, returning to step S204 and waiting for receiving data being sent from the external tool.

On the other hand, the rewrite control program 400 has been broken into a plurality of modules. Specifically, in steps S640 and 650, after the sending of the address command in step S630, the CPU 17 of the external tool 10 sequentially sends, through the communication circuit 11 to the communication circuit 3 of the engine ECU 1, the broken modules from the first module to the last module in this order in a predetermined data command format.

The CPU 21 of the engine ECU 1 executes a series of operations in steps S204 to S205 and S207 to S209 every time it receives the data command corresponding to any one of the first to the last modules of the rewrite control program 400. Specifically, when determining that the data command is received, because the determination in step S204 is YES, the determination in step S205 is NO, and the determination in step S207 is YES, the CPU 21 shifts to step S208. In step S208, the CPU 21 stores the received one of the first to the last modules of the rewrite control program 400 in the RAM 23 at the location thereof; this location is pointed out by the first writing variable.

Figure 7:
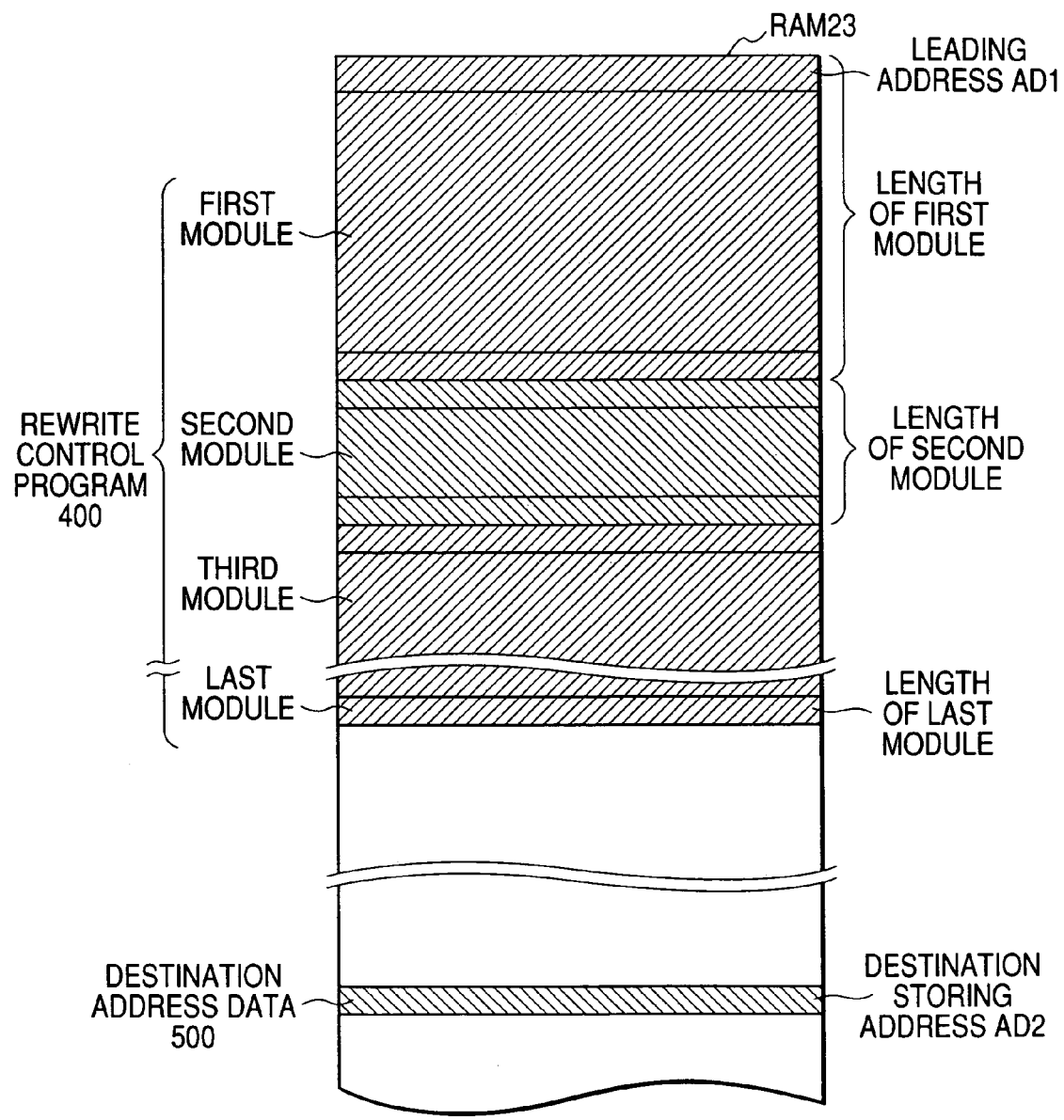
FIG. 7 is a view schematically illustrating an example of the storage area of the RAM illustrated in FIG. 1.
Figure 8:
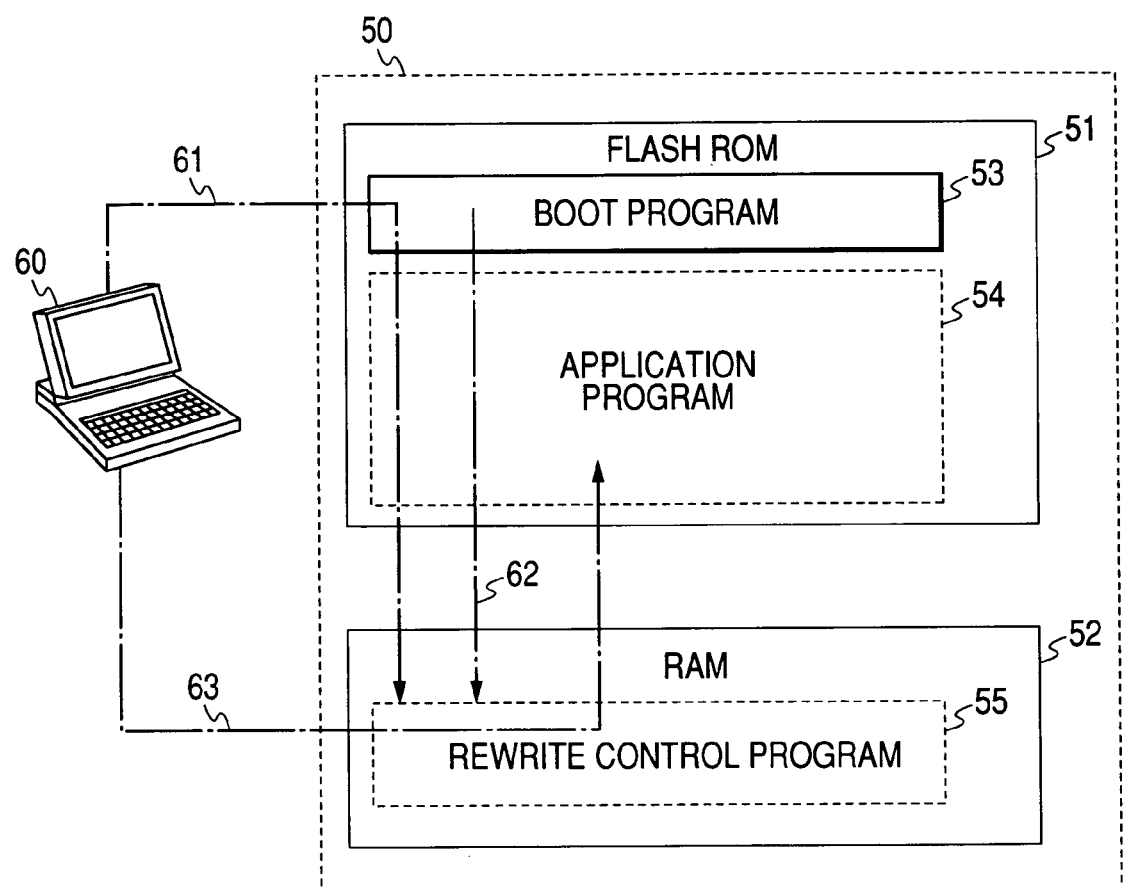
FIG. 8 is a block diagram schematically illustrating the structure of a memory unit of a conventional vehicle control unit installed in a vehicle and illustrating data flow between an external tool and the memory unit.
Figure 9:
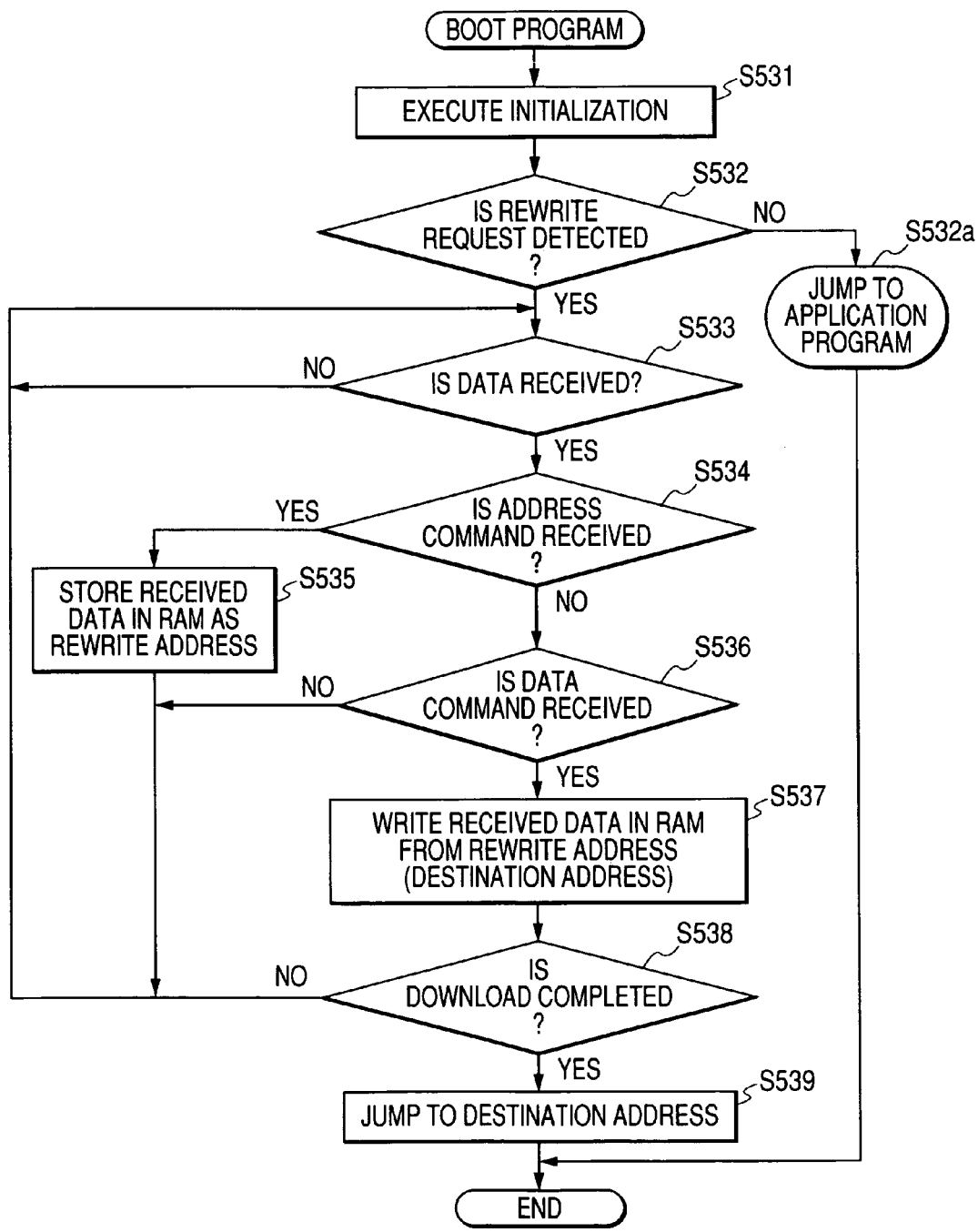
FIG. 9 is a flowchart schematically illustrating the structure of a conventional boot program stored in the memory unit illustrated in FIG. 8.

For example, as illustrated in FIG. 7, in step S208, when receiving the first module of the rewrite control program 400, the CPU 21 stores the first module in the RAM 23 from the leading address AD1 pointed out by the current first writing variable. After that, in step S208, the CPU 21 increments the first writing variable by the number of addresses equivalent to the data length of the received first module. For example, because byte-oriented addresses are allocated to the individual storage locations of normal RAMs, respectively, when the data length of the received first module is 2 bytes, the CPU 21 increments the first writing variable by 2.

Subsequently, the CPU 21 determines whether the data value currently stored in the RAM 23 at the destination storing address AD2 thereof remains the initial value, that is, the base 16 value of FFFFFFFF in step S209. When it is determined that the data value currently stored in the RAM 23 at the destination storing address AD2 thereof remains the initial value (the determination in step S209 is YES), the CPU 21 returns to step S204 and executes the series of operations in steps S204 to S205 and S207 to S209 every time it receives the data command.

For example, when receiving the next second module of the rewrite control program 400 in steps S204, S205, and S207, the CPU 21 stores the next module in the RAM 23 from the address pointed out by the current first writing variable.

As set forth above, the CPU 21 repeatedly executes the series of operations in steps S204 to S205 and S207 to S209 every time it receives the data command until it is determined that the data value currently stored in the RAM 23 at the destination storing address AD2 thereof remains the initial value (the determination in step S209 is YES). This allows the first to the last modules of the rewrite control program 400 sent from the external tool 10 are sequentially stored in the RAM 23 from the leading address AD1 thereof in the order of the first to the last module (see FIG. 7 and the arrow 31 in FIG. 3).

On the other hand, after the completion of sending of all of the modules of the rewrite control program 400, the CPU 17 determines that the rewrite control program sending operation is completed (the determination in step S650 is YES). Next, the CPU 17 sends, to the engine ECU 1 through the communication circuit 11, the second address command containing the destination storing address AD2 described in the second data section 72 of the input file F in step S660.

When receiving the second address command through the communication circuit 3, the CPU 21 of the engine ECU 1 determines that the address command is received (both the determinations in steps S204 and S205 are YES). Then, the CPU 21 stores the received data (the received destination storing address AD2) in a predetermined working area of the RAM 23 as a second writing variable (see FIG. 7), returning to step S204 and waiting for receiving data being sent from the external tool.

On the other hand, the CPU 17 of the external tool 10 sends, through the communication circuit 11 to the communication circuit 3 of the engine ECU 1, a data command corresponding to the destination address data 500 indicative of the leading address (the destination address) AD1 of the rewrite control program 400 to be stored in the RAM 23 in step S670, exiting the rewrite control program sending program 600.

When receiving the data command corresponding to the destination address data 500, because the determination in step S204 is YES, the determination in step S205 is NO, and the determination in step S207 is YES, the CPU 21 shifts to step S208. In step S208, the CPU 21 stores the received destination address data 500 in the RAM 23 at the location thereof; this location is pointed out by the second writing variable corresponding to the destination storing address AD2.

In other words, in step S208, the CPU 21 refers to the RAM 23 at the location pointed out by the destination storing address AD2. Because the initial value has been stored in the RAM 23 at the destination storing address AD2, the CPU 21 rewrites the initial value at the destination storing address AD2 into the destination address data 500 corresponding to the destination address (leading address) AD1 of the rewrite control program 400 in step S208 (see FIG. 7 and the arrow in FIG. 3).

In the next step S209, the CPU 21 therefore determines that the data value currently stored in the RAM 23 at the destination storing address AD2 thereof is different from the initial value (the determination in step S209 is NO), shifting to step S120. In step S210, the CPU 21 refers to the destination address (Reading address AD1) of the rewrite control program 400 stored in the RAM 23 at the destination storing address AD2 thereof, and causes its execution point to jump to the destination address (leading address AD1) in the RAM 23, exiting the boot program 200. As a result, the CPU's execution point is shifted to the leading address AD1 of the rewrite control program 400 in the RAM 23 (see the arrow 33 in FIG. 3).

Thereafter, the CPU 21 starts to execute the rewrite control program 400. The execution of the rewrite control program 400 allows the CPU 21 to receive the application program 300 from the external tool 10, and to store the received application program 300 in the predetermined area of the flash ROM 22 (see the arrow 34 in FIG. 3).

As set forth above, the CPU 21 of the engine ECU 1 with the RAM 23 and the communication circuit 3 executes the boot program 200. The boot program 200 causes the CPU 21 to:

store the initial value in the RAM 23 at the destination storing address AD2 (see step S203);

store the received data sent from the external tool 10 in the RAM 23 at the location pointed out by the first address command (see step S208);

determine whether the data value currently stored in the RAM 23 at the destination storing address AD2 thereof remains the initial value (see step S209); and refer to the destination address stored in the RAM 23 at the destination storing address AD2 and execute the rewrite control program 400 from the destination address when it is determined that the data value currently stored in the RAM 23 at the destination storing address AD2 thereof is different from the initial value (see step S210).

In addition, the CPU17 of the external tool 10 with the communication circuit 11 executes the rewrite control program sending program 600. The rewrite control program sending program 600 causes the CPU 17 to:

send, through the communication circuit 11, the leading address AD1 at which the data of the rewrite control program 400 should be stored (see step S630);

send, through the communication circuit 11, the data of the rewrite control program 400 to the engine ECU 1 (see step S640);

determine whether the sending of the data of the rewrite control program 400 is completed (see step S650); and send, through the communication circuit 11, the destination storing address AD2 to the engine ECU 1 and the destination address data 500 indicative of the destination address AD1 to the engine ECU 1 when it is determined that the sending of the data of the rewrite control program 400 is completed (see steps S660 and S670).

Specifically, the operator uses the external tool 10 set forth above and causes the external tool 10 to execute a first procedure for sending the data of the rewrite control program 400 to the engine ECU 1 and sending the destination address AD1 at which the data of the rewrite control program 400 should be stored. The engine ECU 1 stores the data of the rewrite control program 400 in the RAM 23 at the location pointed out by the destination address AD1.

Next, the operator causes the external tool 10 to execute a second procedure. The second procedure causes the external tool 10 to send the destination storing address AD2 to the engine ECU 1 and send the destination address data 500 indicative of the destination address AD1 to the engine ECU 1 when it is determined that the sending of the data of the rewrite control program 400 is completed. The engine ECU 1 stores the destination address data 500 in the RAM 23 at the destination storing address AD2 and executes the rewrite control program 400 from the destination address AD1 stored at the destination storing address AD2 after the completion of the store of the rewrite control program 400 in the RAM 23.

After the download of the rewrite control program 400 from the external tool 10 to the engine ECU 1, the execution point of the engine ECU1 therefore automatically jumps to the rewrite control program 400.

That is, in the embodiment, the boot program 200 is described such that the CPU 21 of the engine ECU1 reads out the data (destination address AD1) stored at the destination storing address AD2 in the RAM 23 so that the execution point of the CPU 21 jumps to the read destination address AD1. This makes it possible to store, at the destination storing address AD2 in the RAM 23, variable destination addresses depending on various types of vehicle control units.

Even if the destination addresses stored at the destination storing address AD2 in the RAM 23 are different from each other depending on various types of vehicle control units, therefore, it is possible for the CPU 21 to recognize the destination addresses by only reading out the data stored at the destination storing address AD2 in the RAM 23. As a result, it is possible to meet variable destination addresses to which the execution points of the various types of vehicle control units jump after the completion of the download without rewriting the boot program 200. This allows the efficiency of installation of the boot program 200 into the various types of vehicle control units to increase, thereby improving the versatility of the boot program 200.

Note that, in the embodiment, the engine ECU 1 for example corresponds to a vehicle control unit, but as vehicle control units, various types of ECUs for controlling mechanisms installed in a vehicle, such as brake control ECUs and automatic-transmission control ECUs, can be applied.

Note that, in the embodiment, the external tool 10 for example corresponds to a system for sending, to a control unit with a rewritable storage medium according to the present invention. The CPU 17 and the communication circuit 11 for example correspond to first to fourth sending units according to the present invention. The boot program can be booted in response to an external boot signal sent from, for example, the external tool 10.

The operation of the CPU 21 of the engine ECU 1 based on the instructions in steps S204 to S208 of the boot program 200 for example serves as first to fourth receiving units according to the present invention. The operation of the CPU 21 of the engine ECU 1 based on the instruction in step S210 of the boot program 200 for example serves as an execution unit according to the present invention. The operation of the CPU 21 of the engine ECU 1 based on the instruction in step S203 of the boot program 200 for example serves as an initializing unit according to the present invention. The operation of the CPU 21 of the engine ECU 1 based on the instruction in step S209 of the boot program 200 for example serves as a determining unit according to the present invention.

In the embodiment, the destination address can be set to an arbitrary address at which an arbitrary instruction in the rewrite control program 400 should be stored in the RAM 23

Note that, in the embodiment, the destination address data can be configured to an abbreviated identifier (abbreviated address) with a predetermined data volume smaller than that of the destination address data designating the destination address AD1; this abbreviated identifier is capable of identifying the destination address AD1. For example, the abbreviated identifier is configured to be indicative of part of any one of all addresses in the RAM 23. In this case, the engine ECU 1 can be provided with a table stored in the flash ROM 22; this table representing relationships between abbreviated identifiers and corresponding addresses in the RAM 23. This structure of the engine ECU 1 allows identification of the destination address corresponding to the received one of the abbreviated identifiers.

In addition, the input file F to be stored in the external tool 10 can include, as the first storing address data, an abbreviated identifier with a predetermined data volume smaller than that of the destination address data designating the destination address AD1; this abbreviated identifier is capable of identifying the destination address AD1.

For example, the external tool 10 can be provided with a table stored in the HDD 15; this table representing relationships between abbreviated identifiers and corresponding addresses in the RAM 23, This structure of the external tool 10 allows the CPU 17 to specie one of the abbreviated identifiers, which corresponds to the destination address AD1 stored in the first data section 71 of the input file F, and to send the specified abbreviated identifier as the destination address data 500. This structure of the external tool 10 allows the amount of data required to send the destination address data and actually sent from the external tool 10 to the engine ECU 1 to decrease.

Moreover, in the embodiment, during the execution of the boot program 200, the engine ECU 1 determines that the reception of the rewrite control program 400 is completed based on detecting that the data value stored in the destination storing address AD2 varies, thereby shifting to execute the rewrite control program 400. The present invention, however, is not limited to the structure.

Specifically, as already described in the Related Art, the engine ECU 1 can be programmed to:

receive data indicative of the size of the rewrite control program 400 in addition to the first address command containing the destination address (leading address) AD1 of the rewrite control program 400;

determine that the reception of the rewrite control program 400 has been completed when the whole volume of the rewrite control program 400, which have ever been received to be stored in the RAM 23, reaches the volume equivalent to the size of the rewrite control program 400; and cause its execution point to jump to the destination address (leading address) AD1 of the rewrite control program 400. In this structure of the engine ECU 1, the timing of sending the destination address data from the external tool 10 is not limited to the timing after the completion of sending the rewrite control program 400. Specifically, the timing of sending the destination address data from the external tool 10 can be set before sending the rewrite control program 400 or during the sending thereof.

Furthermore, in the embodiment, the CPU 21 of the engine ECU 1 is configured to store the destination address data 500 indicative of the leading address AD1 of the rewrite control program 400 at the destination storing address AD2 in the RAM 23, but the present invention is not limited to the structure.

Specifically, in the present invention, a plurality of pieces of destination address data 500' indicative of a plurality of destination addresses corresponding to the plurality of modules of the rewrite control program 400 can be set. In this modification, a plurality of destination modification addresses corresponding to the plurality of destination addresses can also be set.

That is, in the modification, the external tool 10 can send, to the engine ECU 1, the second address command designating the plurality of destination storing addresses. In addition, the external tool 10 can send, to the engine ECU 1, the plurality of pieces of destination address data 500' indicative of the destination addresses corresponding to the plurality of modules of the rewrite control program 400 to be stored in the RAM 23.

When receiving the second address command and the plurality of pieces of destination address data 500', the CPU 21 can store the plurality of pieces of destination address data 500' at the corresponding destination addresses in the RAM 23, respectively (see the arrow 32 in FIG. 3).

After the completion of reception of all of the modules of the rewrite control program 400 and of store of them in the RAM 23, the CPU 21 causes its execution point to jump to any one of the destination addresses stored in the corresponding destination storing addresses (see the arrow 33 in FIG. 3).

The CPU 21 therefore can start to execute any one of the modules of the rewrite control program 400 from the instruction stored at any one of the destination addresses of the RAM 23.

In the embodiment, it is important to note that, while the present invention has been and will continue to be described in the context of each of fully functional computers, such as the vehicle control unit 1 and the external tool 10. In the present invention, however, the elements provided in each of the vehicle control unit 1 and the external tool 10 can be implemented as dedicated hardware devices, such as custom LSI (Large-Scale Integration) circuits.

Moreover, those skilled in the art will appreciate that the present invention is capable of being distributed as program products, for example, the boot program 200 and the rewritable control program sending program 600, in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiment and modifications of the present invention, it win be understood that various modifications which are not described yet may be made therein, and it is intended to cover in the appended claims all such modifications as fall within the true spirit and scope of the invention.

What is claimed is:

1. A method for a computer to send, to a control unit having a rewritable storage medium with a destination storing address at which an initial value has been stored, a rewrite control program so that the control unit executes the rewrite control program based on a predetermined destination address in the rewritable storage medium after data stored in the destination storing address is different from the initial value, the computer being external to the control unit, and method comprising:

sending, by a sending program stored on the computer in response to command, to the control unit, first designating data designating the destination address in the rewritable storage medium;

receiving, by the control unit, the first designating data;

sending, from the computer to the control unit, modules of the rewrite control program;

receiving, by the control unit, the modules of the rewrite control program to store the modules of the rewrite control program in the rewritable storage medium from the destination address thereof;

after all of the modules of the rewrite control program have been sent to the control unit, sending, by a sending program stored on the computer in response to command, to the control unit, the destination address and second designating data designating the destination storing address in the rewritable storage medium; and receiving, by the control unit, the destination address to store the destination address in the rewritable storage medium at the destination storing address thereof so that the initial value is rewritten into the destination address.

2. A system equipped with a computer and a control unit having a rewritable storage medium with a destination storing address at which an initial value has been stored for sending, to the control unit from the computer, a rewrite control program so that the control unit executes the rewrite control program based on a predetermined destination address in the rewritable storage medium after data stored in the destination storing address is different from the initial value, the system comprising:

a first sending unit configured to send, by a sending program stored on the computer in response to command, to the control unit which is external to the computer, first designating data designating the destination address in the rewritable storage medium;

first receiving unit configured to receive the first designating data;

a second sending unit configured to send, to the control unit via processing by at least one processor of the computer, modules of the rewrite control program;

a second receiving unit configured to receive the modules of the rewrite control program to store the modules of the rewrite control program in the rewritable storage medium from the destination address thereof;

a third sending unit configured to, after all of the modules of the rewrite control program have been sent to the control unit, send, by a sending program stored on the computer in response to a command, to the control unit, the destination address and second designating data designating the destination storing address in the rewritable storage medium; and a third receiving unit configured to receive the destination address to store the destination address in the rewritable storage medium at the destination storing address thereof so that the initial value is rewritten into the destination address.

3. A non-transitory computer-readable storage media comprising a first storage medium with a rewritable control program sending program stored thereon, and a second rewritable storage medium with a boot program stored thereon, the rewritable control program sending program being executable by a computer to instruct the computer to send, to a control unit having the second rewritable storage medium with a destination storing address at which an initial value has been stored, a rewrite control program so that the control unit executes the rewrite control program based on a predetermined destination address in the rewritable storage medium after data stored in the destination storing address is different from the initial value, the rewritable control program sending program being configured to instruct the computer to:

send, in response to a command, to the control unit which is external to the computer, first designating data designating the destination address in the rewritable storage medium;

send, to the control unit, modules of the rewrite control program; and after all of the modules of the rewrite control program have been sent to the control unit, send, in a response to a command to the control unit, the destination address and second designating data designating the destination storing address in the rewritable storage medium;

the boot program being configured to instruct the control unit to:

receive the first designating data;

receive the modules of the rewrite control program to store the modules of the rewrite control program in the rewritable storage medium from the destination address thereof; and receive the destination address to store the destination address in the rewritable storage medium at the destination storing address thereof so that the initial value is rewritten into the destination address.

* * * * *